United States Patent
Geibl et al.

[19]
[11] Patent Number: 6,143,438
[45] Date of Patent: Nov. 7, 2000

[54] COLD FLOW SEALING VENT

[75] Inventors: Matthias Geibl, Germantown; Thomas J. Dougherty, Waukesha; Gerald D. Slayton, South Milwaukee; Mark S. Inkmann, Wauwatosa; Guy L. Pfeifer, Milwaukee, all of Wis.

[73] Assignee: Johnson Controls Technology Co., Plymouth, Mich.

[21] Appl. No.: 09/028,732

[22] Filed: Feb. 24, 1998

[51] Int. Cl.[7] .................................................. H01M 2/12
[52] U.S. Cl. .................................................. 429/72; 429/82
[58] Field of Search .................................... 429/72, 82, 87, 429/88, 89, 78

[56] References Cited

U.S. PATENT DOCUMENTS

| | | | |
|---|---|---|---|
| 3,394,035 | 7/1968 | Cox et al. | 429/72 |
| 4,029,855 | 6/1977 | Dougherty et al. | 429/82 |
| 4,338,383 | 7/1982 | Jutte et al. | 429/88 |
| 4,778,735 | 10/1988 | Shestok et al. | 429/82 |
| 5,132,175 | 7/1992 | Mrotek et al. | 429/86 |
| 5,162,164 | 11/1992 | Dougherty et al. | 429/9 |
| 5,217,823 | 6/1993 | Geibl et al. | 429/55 |
| 5,284,720 | 2/1994 | Thuerk et al. | 429/87 |
| 5,702,841 | 12/1997 | Thomas et al. | 429/88 |

FOREIGN PATENT DOCUMENTS

| | | | |
|---|---|---|---|
| 2153702 | 5/1973 | France | H01M 1/00 |
| 1905215 | 8/1970 | Germany | H01M 7/00 |
| 1906191 | 8/1970 | Germany | H01M 7/00 |
| 1599755 | 10/1981 | United Kingdom | H01M 2/12 |

*Primary Examiner*—Carol Chaney
*Assistant Examiner*—Monique Wills
*Attorney, Agent, or Firm*—Quarles & Brady LLP

[57] ABSTRACT

An improved vent cap system for use in an electrochemical battery is provided which includes a ring flange for forming a ring seal between the vent cap assembly and the fill tube. When the vent cap assembly is positioned in the battery housing, the ring flange and the fill tube deform to create a seal therebetween to provide a fluid tight seal.

27 Claims, 3 Drawing Sheets

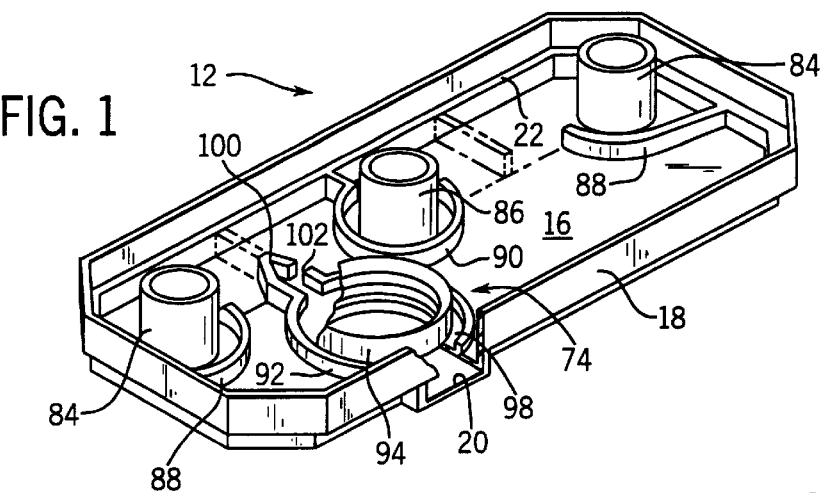
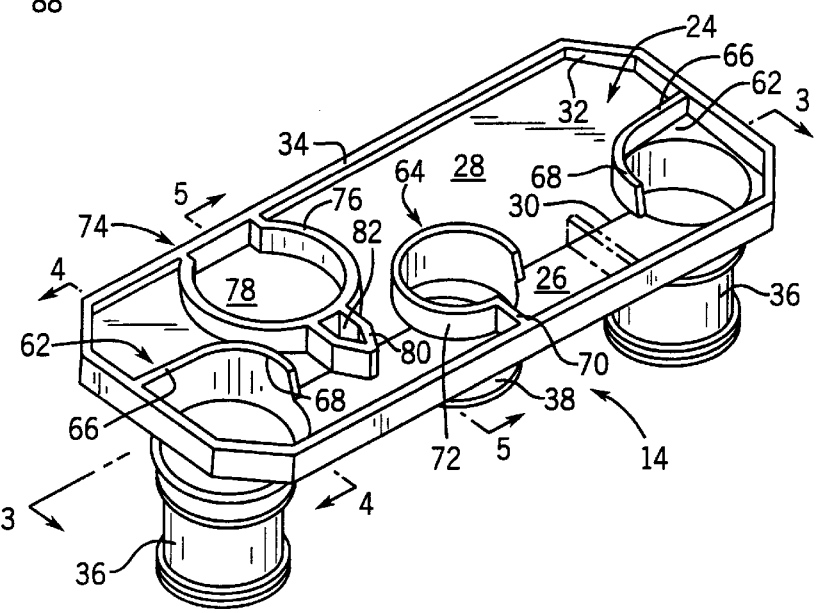
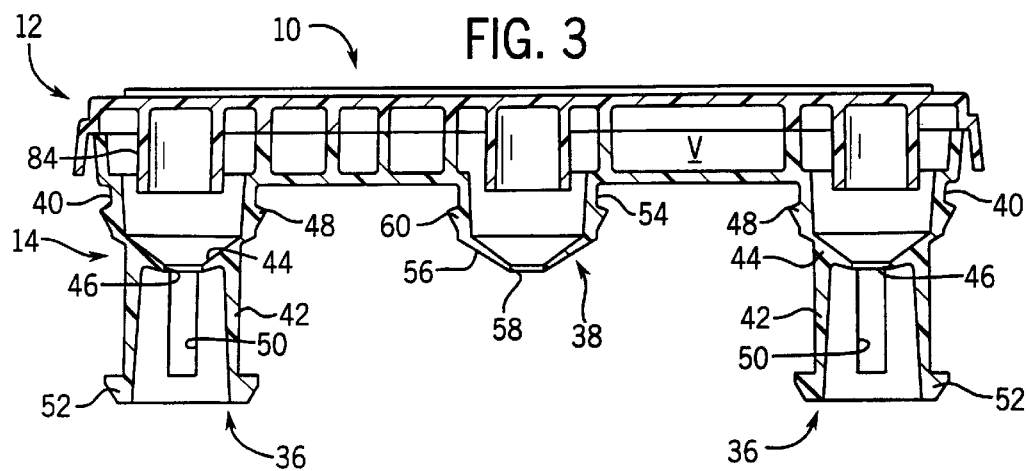

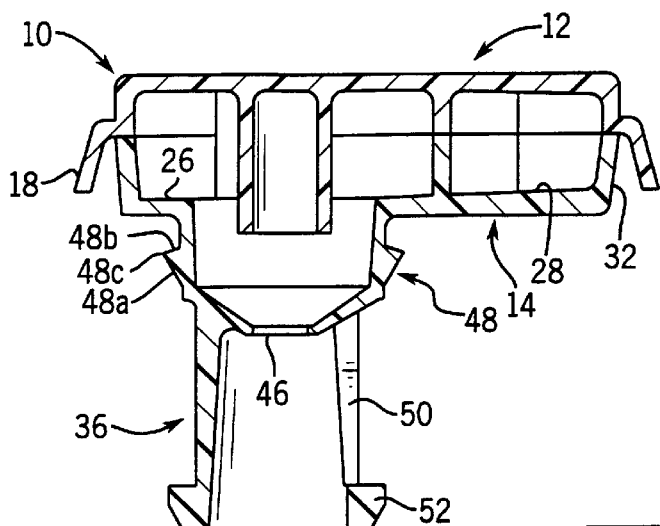
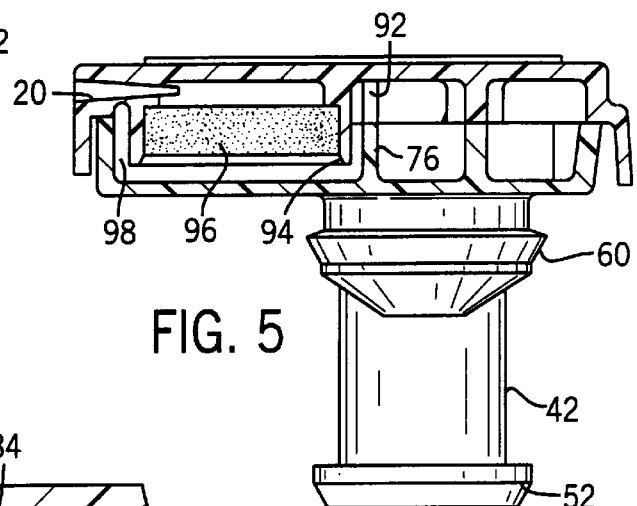
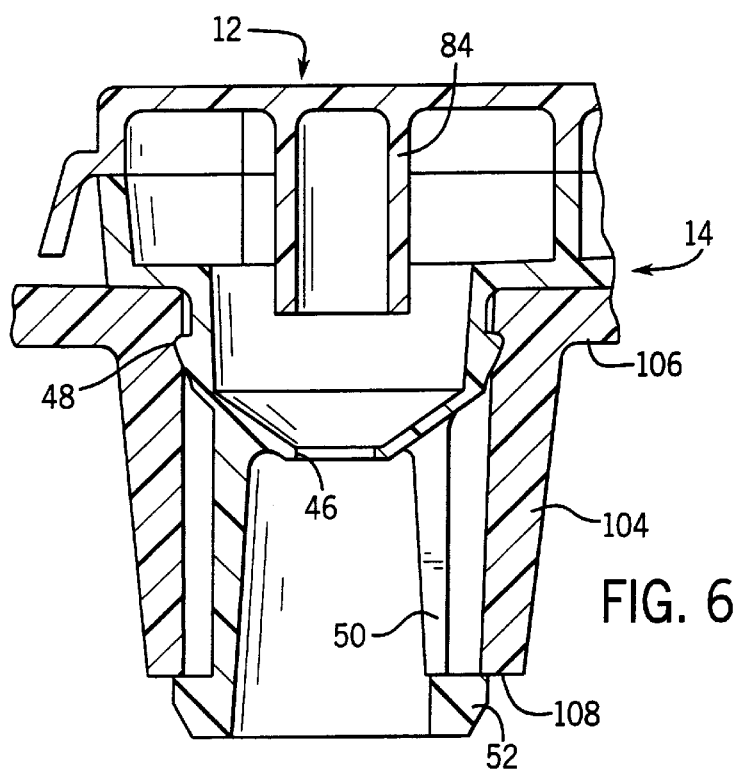

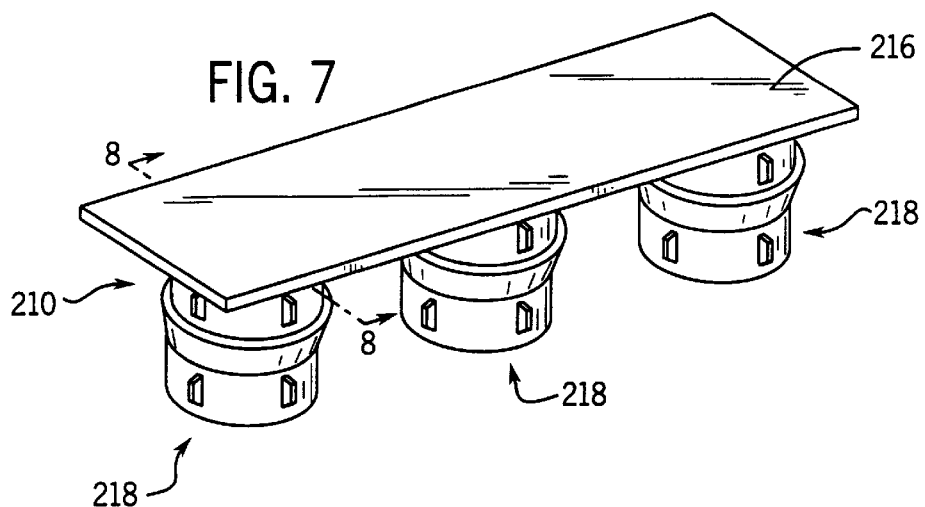
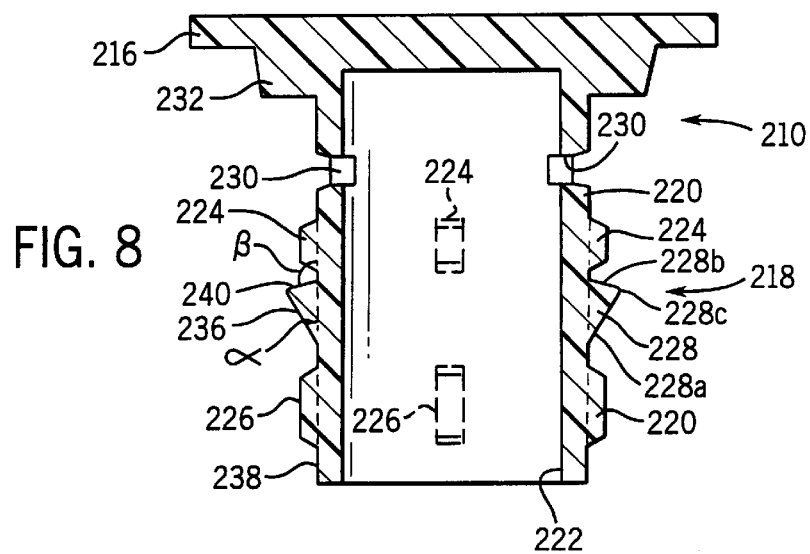
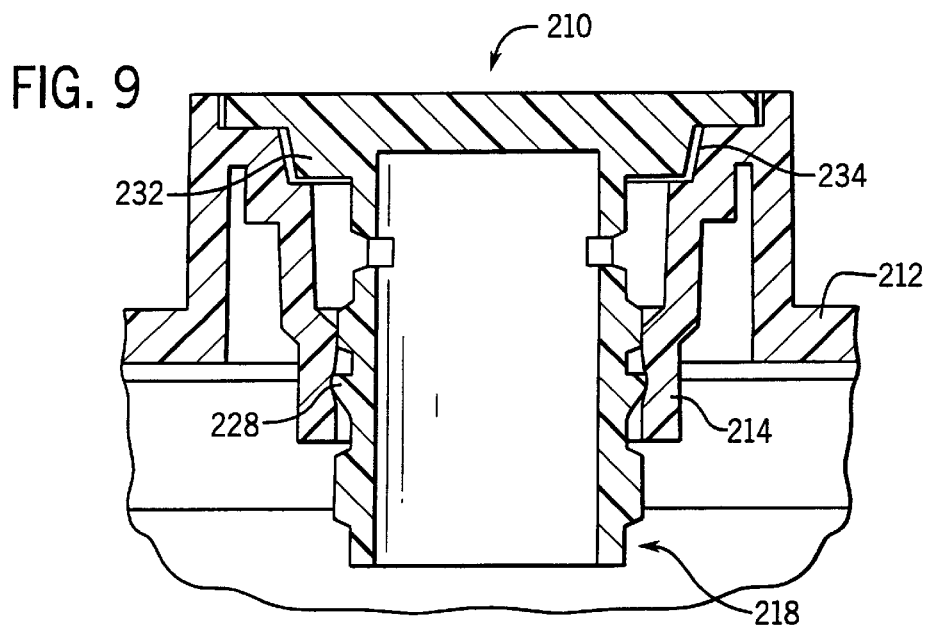

COLD FLOW SEALING VENT

BACKGROUND OF THE INVENTION

1. Field of the Invention

The present invention relates generally to sealed electric storage batteries, and more particularly to vent caps for such batteries which provide a flow path for the escape of hydrogen and oxygen formed during the electro-chemical reaction which takes place in such batteries. Still more specifically, the invention relates to a vent cap which also controls the flow of electrolyte which may enter the vent cap to ensure that it is returned to the battery cell and does not flow through the vent cap to the exhaust gas port or become entrained in the flow of gases passing through the vent cap.

2. Description of Related Art

Conventional lead-acid batteries, such as those used in automotive applications, generally include a number of cells disposed in a battery housing. Each cell typically includes a plurality of positive and negative battery plates or electrodes. Separators are sandwiched between the plates to prevent shorting and undesirable electron flow produced during the reaction occurring in the battery. The plates and separators are immersed in a liquid electrolyte in the cell, the most common being aqueous sulfuric acid. The positive plate generally is constructed of a lead-alloy grid covered with lead oxide, while the negative plate generally contains lead as the active material, again covering a lead-alloy grid.

The electromotive potential of each battery cell is determined by the chemical composition of the electro-active substrates employed in the electrochemical reactions. For lead-acid batteries, such as those described above, the potential is usually about two volts per cell, regardless of cell volume. Since vehicles manufactured by original equipment manufacturers (OEMs) typically require 12-volt batteries, most automotive batteries include six cells (6 cells×2 volts per cell=12 volts). The size of the housing for the battery is selected based on the packaging constraints of a particular vehicle, i.e., the physical dimensions defined by the vehicle manufacturer for containment of the battery in the engine compartment.

In most battery constructions the battery housing includes a box-like base containing the cell and is made of a moldable resin. The housing is generally rectangular in horizontal cross section, the cells being provided by vertical partitions within the housing. A cover is provided for the casing, the cover includes terminal bushings and a series of fill tubes to allow electrolyte to be added to the cells and to permit servicing, if required, during the life of the battery. To prevent undesirable spillage of electrolyte from the fill tubes, batteries have included some sort of filler hole cap. Battery electrolyte spillage can be caused by a number of factors, including vibration or tilting as the vehicle with which the battery is used maneuvers during normal use. Electrolyte escape may also be caused by battery overheating, a problem especially pronounced in recent years with smaller car engines which tend to create an adverse thermal environment around the battery.

In addition to preventing spillage of electrolyte from the cells, the design of the battery cover and filler caps need to perform an important and different function, namely exhaust of gases generated during the electrochemical reaction. More specifically, gases are liberated from lead-acid batteries during the charge and discharge reactions. Such reactions start at the time the battery is originally charged (called "formation") by the manufacturer or by the retailer or vehicle manufacturer. They also occur during normal operating use of the battery. Factors such as high current charge and discharge conditions, and changes in temperature, can affect the rate at which gas evolution occurs. The gas generation and evolution issues in lead-acid battery construction are particularly important because the liberated gases are hydrogen and oxygen, and it is important to vent such gases in a controlled way from the battery to prevent pressure build-ups in the housing which could lead to electrolyte leaks, housing failures or, most significantly, explosions within the housing.

Electrolyte spillage and gas evolution are interrelated and equally important in the construction of an effective vent cap system. For example, electrolyte may enter the vent cap through several mechanisms. One mechanism is through vibrational or tilting spray of electrolyte into the cap, and another is through a mechanism frequently referred to as "pumping." The latter occurs when gas evolved in the battery bubbles from the cells and carries or forces electrolyte out the fill tube and into the cap. Upon entering the cap, the electrolyte may be carried out the exhaust passage to cause damage to external battery components such as the battery terminals or adjacent engine components.

OEMs have recognized the importance of the dual function performed by the vent caps and have instituted a number of testing specifications designed to ensure electrolyte retention within the cells of the battery. One such test involves tilting a battery thirty-five degrees (35°) about the longitudinal center line of the battery. While a number of different solutions have been proposed to provide an effective vent cap system, optimization has still not been achieved in one vent cap due to numerous demands with which the battery designer is faced—ensuring adequate electrolyte return, condensation, reducing electrolyte in the exhaust flow, pumping of electrolyte through the vent cap system and tilting of the battery. All of these factors can result in electrolyte loss.

An improved vent cap system for minimizing the possibility of electrolyte leakage from the battery and efficiently directing gases from the battery is still needed. Such an improved vent cap would represent a substantial advance in the art.

SUMMARY OF THE INVENTION

The present invention provides a vent cap system which includes a one-piece or two-piece construction adapted to facilitate electrolyte return to the battery, minimize electrolyte entrainment of the exhaust flow path, distribution of electrolyte to a plurality of battery cells to maintain desirable electrolyte level and an improved barrel construction. More particularly, the vent cap sealing mechanism of the present invention minimizes the escape of gas or electrolytes around the barrel and into the space between the bottom of the vent cap and the battery cover.

The present invention also features a vent cap in which any electrolyte flow into the cap is redirected back to a cell of the battery, while gases escaping from the battery are directed to a gas outlet through a tortuous but effective gas flow path. These particular features are also accomplished in various battery orientations, including orientations in which the battery is tilted significantly about its longitudinal axis.

The present invention also features a vent cap having internal baffles constructed and arranged to prevent accumulation of pockets of electrolyte within the cap and an attenuation element entry port arranged and constructed to minimize intrusion of electrolyte.

These and other features will become apparent from the following detailed description of the preferred embodiment, taken in conjunction with the figures. Generally, however, they are accomplished by providing a vent cap system having a ganged arrangement for three battery fill tubes and including molded thermal plastic component. The vent cap includes three aligned splash barrels to be inserted in the battery fill tubes, each including a lower central aperture, breather holes about the central aperture and an external ring flange surrounding the barrel to act as a fluid tight seal between the barrels and the fill tubes.

In one preferred embodiment, the vent cap incudes a top and bottom component. Barrels extend from an angled floor of the cap of the bottom component adjacent an edge thereof so that any electrolyte entering the cap will flow toward the aligned and spaced apart barrel openings. Barriers are provided about the barrel openings to prevent pockets of electrolyte from accumulating in the cap. The lower component also includes the bottom portion of a flame arrester housing which itself includes an entry chamber. The top component includes downwardly directed tubes or splash guards having open bottoms and being arranged to be coaxial with but spaced slightly above the barrel openings when the top and bottom components are assembled. The top component also includes the upper portion of the flame arrester housing including a cup for receiving the preferred microporous material, and the entry chamber. The latter is open to provide a pathway for the escape of gases through the arrester and out of an exhaust port provided in the upper compartment. The opening to the arrester housing is optimally located in the upper half of the vent cap and above the center line of the barrel openings. Other ways in which the vent cap of the present invention, or modifications thereof, provide the features mentioned above, and other improvements over the prior art, will become apparent to one of ordinary skill in the art after reading the balance of the specification and after reviewing the drawings. Such other ways and modifications are deemed to be within the scope of the present invention.

BRIEF DESCRIPTION OF THE DRAWINGS

The objects and features of this invention will become apparent from a reading of the following detailed description taken in conjunction with the drawings in which:

FIG. 1 is a perspective view of the interior of the top component of the vent cap system of the present invention;

FIG. 2 is a perspective view of the interior of the lower component of the vent cap system of the present invention;

FIG. 3 is a cross-sectional view of the assembled vent cap system illustrated in FIGS. 1 and 2 taken along the line 3—3 shown in FIG. 2;

FIG. 4 is a cross-sectional view of the assembled vent cap system taken along the line 4—4 shown in FIG. 2;

FIG. 5 is a cross-sectional view of the assembled vent cap system taken along line 5—5 shown in FIG. 2;

FIG. 6 is a cross-sectional view similar to that shown in FIG. 3 in which the vent cap system is sealably installed within a battery housing;

FIG. 7 is a perspective view of a second preferred embodiment of the present invention;

FIG. 8 is a cross-sectional view of the vent cap system illustrated in FIG. 7 taken along the line 8—8 shown therein; and FIG. 9 is a cross-sectional view similar to that shown in FIG. 8 showing the second preferred vent cap system installed within a battery housing.

In the various figures, like reference numerals are used to indicate like components.

DETAILED DESCRIPTION OF THE PREFERRED EMBODIMENTS

Before proceeding to a detailed description of the preferred embodiments, several general comments are warranted concerning the scope and applicability of the present invention. The improved vent cap assembly of the present invention includes several novel features which, when combined, lead to the most preferred embodiment. However, several of these features could be employed individually or in subcombinations to achieve specific needs for a particular battery design.

A ganged three (3) fill tube arrangement is illustrated and described herein which is an arrangement that is fairly typical of vent caps used in a number of current battery designs, such as those used for 12-volt automobile batteries. Ganged caps having more or less barrels per cap are encompassed by the present invention and could be readily constructed and designed by one of ordinary skill in the art after reading this specification.

The preferred material for constructing the vent caps of the present invention is a polypropylene copolymer with about 18 weight percent polyethylene, but other thermal plastic moldable resins which provide a similar cold flow characteristic as the preferred material can be used. In fact, thermoset resins could be also employed if a technique other than heat sealing is employed to join the multiple component cap assemblies together. One such technique would be the use of adhesives. An essential property of the material used for the cap components is that it exhibits a good cold flow characteristic which enabled a ring seal to be formed in the fill tube when the vent cap assembly is installed within the battery fill tube. Another primary criteria for the cap components, as well as for any explosion attenuation material used therein, is that these components be able to withstand the harsh environment encountered in lead-acid battery systems, including reduced and elevated temperatures and the acidic environment generated by the battery electrolyte. Similarly, a soft ABS and nylon based plastic, such as Noral manufactured and distributed by General Electric, could be utilized for the components of the vent cap system of the present invention.

Many of the dimensional relationships are for illustrative purposes and could vary widely with different types of batteries. Unless otherwise noted, these dimensions are deemed to be noncritical. For example, the length of the barrels, as well as the width, length and height of the cap, can be varied without departing from the invention's intended scope.

Referring now to FIGS. 1–6, vent cap assembly 10 includes a top component 12 and a bottom component 14 which are interfit in a spaced facing relationship. More specifically, top portion 12 includes a planar upper surface 16 and a stepped skirt 18 extending therefrom. Vent passageway 20 is formed through skirt 18 along a side of top component 12 and provides fluid communication from the interior of vent cap assembly 10 to the outside environment therearound. A stepped flange 22 is formed in top assembly 12 and engages a complementary edge formed on bottom component 14 as hereinafter described.

Referring now to FIG. 2, bottom component 14 includes floor 24 comprised of two sections, a horizontal section 26 and an inclined section 28 extending from planar section 26 at transition line 30. Bottom component 14 also includes skirt 32 having interface edge 34 formed thereon. When assembled, interface edge 34 of bottom portion 14 directly abuts flange 22 of upper portion 12 in a nesting configuration. These two major components of vent cap assembly 10 are joined to one another by any suitable means, such as by heat sealing edge 34 of bottom portion 14 to flange 22 of top portion 12. In this manner, vent cap assembly 10 defines an interior vent cap volume v.

Bottom component 14 includes three vent cylinders, a pair of outer vent cylinders 36 and an inner vent cylinder 38, extending downwardly from floor 32. Vent cylinders 36, 38 are arranged in a linear, spaced apart relationship, the center of which lay along transition line 30. Outer vent cylinder 36 includes a generally cylindrical upper portion 40 and a generally cylindrical lower portion 42. An inwardly tapered surface 44 is formed between upper portion 40 and lower portion 42 and includes a central aperture 46 extending therethrough to provide fluid communication between upper portion 40 and lower portion 42. Ring flange 48 is formed on an outer surface of upper portion 40 and provides a ring sealing mechanism when vent cap assembly 10 is properly positioned within a battery housing as will be further described herein. Lower portion 42 has longitudinal slot 50 formed therein to provide fluid communication to the interior volume of lower portion 42. Retaining flange 52 is formed on the outer surface of lower portion 42 at an end opposite of upper portion 40. Aperture 46 and breather slot 50 will permit electrolyte and gases to enter or leave the cap when it is assembled and the vent cylinders are placed in the fill tubes of the battery.

Lower portion 42 and retaining flange 52 of outer vent cylinder 36 is provided to ensure proper alignment of vent cap assembly 10 during insertion within fill tube 104 of battery housing 106. More specifically, retaining flange 52 is dimensioned to engage a bottom edge 108 defined by fill tube 104 such that vent cap assembly 10 is precisely installed and locked into position. More specifically, retaining flange 52 slightly deforms fill tube 104 in an elastic manner until positioned below bottom edge 108. At this point, fill tube 104 returns to its original dimension so that bottom edge 108 engages retaining flange 52 to secure vent cap assembly 10 to battery housing 106. While the inclusion of cylindrical lower portion 42 and retaining flange 52 is presently preferred, one skilled in the art would readily recognize that other means exist for appropriately aligning and retaining vent cap assembly 10 within battery housing 106.

Inner vent cylinder 38 includes a cylindrical wall portion 54 extending from floor 24 and terminating at tapered surface 56. Aperture 58 is formed in tapered surface 56. Ring flange 60 is formed on an outer surface of cylindrical wall portion 54 and provides a ring seal between inner vent cylinder 38 and the fill tube of the battery housing in a manner further described herein.

With particular reference to FIG. 4, floor 24 includes planar portion 26 and inclined portion 28. Planar portion 26 extends along skirt 32 adjacent vent cylinders 36, 38 and extends inwardly to transition line 30 through the axis of vent cylinders 36, 38. Floor 24 then rises along inclined portion 28 to skirt 32 opposite vent cylinders 36, 38. The incline in the most preferred embodiment is four and one half degrees (4.5°), but could be in a broader preferred range of three degrees to six degrees (3°–6°), or even broader range of about one degree to sixteen degrees (1°–16°). Thus, inclined portion 28 facilitates drainage of electrolyte which has accumulated within vent cap assembly 10 by directing the electrolyte toward vent cylinders 36, 38 where it is returned to the battery cell.

With reference to FIG. 2, bottom component 14 includes baffles 62, 64, circumscribing outer vent cylinder 36 and inner vent cylinder 38, respectively. Outer baffles 62 include a linear portion 66 extending generally perpendicular from skirt 32 and a generally arcuate portion 68 which partially extends around outer vent cylinder 36. Similarly, inner baffle 64 includes a linear portion 70 extending generally perpendicularly from skirt 32 and an arcuate portion 72 extending partially around inner vent cylinder 38. Outer baffles 62 and inner baffles 64 direct the flow of electrolyte from inclined surface 28 toward vent cylinders 36, 38 to further facilitate drainage into the cell of the battery.

Bottom component 14 also includes flame arrester housing 74 having a generally circular wall portion 76 extending from skirt 32 and defining a first chamber 78. A five-sided wall portion 80 extends from a portion of circular wall 76 opposite skirt 32 and defines a second chamber 82.

With reference now to FIGS. 1, 3 and 4, top component 12 includes outer tubular splash guards 84 and inner tubular splash guards 86 extending generally perpendicularly from top planar portion 16. Splash guards 84, 86 are open and of a length selected so that the open end is spaced slightly below the plane defined by planar portion 26 of floor portion 24 when vent cap assembly 10 is fully assembled. Top component 12 further includes outer baffle 88 and inner baffle 90 shaped and generally arranged to meet with and to be sealed to outer baffle 62 and inner baffle 64, respectively. Splash barrels 84, 86 and baffles 88, 90 will form walls extending between top portion 16 of top component 12 and floor 24 of bottom component 14, acting to effectively prevent splashing of electrolyte entering vent cap assembly 10 from apertures 46, 58 beyond the containment provided thereby. This structure, however, permits unobstructed flow paths from vent cylinders 36, 38 to the interior volume of vent cap assembly 10.

Top component 12 also has a portion of flame arrester housing 74 formed therein including an outer circular wall 92 having an upper surface adapted to engage and be sealed to circular wall 76 formed on bottom component 14. An inner circular wall 94 is formed concentric to and is generally taller than outer circular wall 92. Inner circular wall 94 is adapted to receive flame arrester disk 96 (shown in FIG. 5) which, in the most preferred embodiment, is made from a micro-porous cintered polyethylene material. Annular passageway 98 is thus provided between outer and inner circular walls 92, 94 which is in fluid communication with vent port 20. A five-sided wall portion 100 extends from outer cylindrical wall 92 opposite skirt 18 and is adapted to engage and be sealed with five-sided wall portion 80 of bottom component 14. A passageway is provided in five-sided wall portion 100 to permit fluid communication from the interior volume of vent cap assembly 10 to annular passageway 98. As presently preferred, passageway 102 is located directly above a line passing through the center of outer and inner splash barrels 84, 86 and located at the highest possible location within vent cap assembly 10, thereby minimizing the intrusion of liquid electrolyte into flame arrester housing 74.

An important feature of the present invention is the use of ring flange 48, 60 to create a ring seal between vent cylinder 36, 38 and fill tube 104 when vent cap assembly 10 is positioned on battery housing 106. With particular reference to FIGS. 4 and 6, ring flange 48 has leading portion 48*a* formed on a lower edge thereof and trailing portion 48*b* formed on an upper portion thereof. The intersection of leading portion 48*a* and trailing portion 48*b* defines apex 48*c* which is slightly rounded to provide a smooth transition therebetween. Leading portion 48*a* defines a first sloped face having an angular orientation relative to the outer wall of vent cylinder 36 of between twenty and forty degrees (20°–40°) and preferably thirty degrees (30°). Trailing portion 48b defines a second sloped face having an angular orientation relative to the outer wall of vent cylinder 36 of between ninety-five and one hundred fifteen degrees (95°–115°) and preferably one hundred five degrees (105°).

Ring flange 48 is formed of a polypropylene copolymer plastic with approximately 5–20% polypropylene by weight, and has a radial thickness, i.e. the distance from the outer wall of upper cylindrical portion 40 of vent cylinder 36 to apex 48c, such that an interference exists between apex 48c and fill tube 104 of battery housing 106. It is important to provide a sufficient interference to create an adequate ring seal without utilizing excessive force to insert vent cap 10 into fill tube 104. An interference in the range between seven thousandths and forty thousandths of an inch (0.007"–0.040"), and more preferably on the order of twenty thousandths to twenty-seven thousandths of an inch (0.020"–0.027"), provides sufficient overlap to create an adequate ring seal between ring flange 48 and fill tube 104. Fill tube 104 is formed of a polypropylene copolymer plastic with approximately 5–20% polyethylene by weight, and has a wall thickness in the range between of approximately thirty thousandths and eighty thousandths of an inch (0.030"–0.080") and more preferably on the order of fifty thousandths to sixty thousandths of an inch (0.050"–0.060") to allow for sufficient wall deformation to create an adequate ring seal.

FIG. 6 illustrates an especially preferred example of the present invention in which the overall length of ring flange 48 is 0.5", the radial thickness of ring flange 48 is 0.05", the angle of leading portion 48a is formed at 30°, and the angle of trailing portion 48c is formed at 75°. Fill tube 106 is formed of polyethylene and has a wall thickness of sixty thousandths of an inch (0.060"). Ring flange 48 is formed of a polypropylene copolymer and has an interference of approximately twenty-four thousandths of an inch (0.024") with fill tube 106.

When vent cap assembly 10 is positioned on battery housing 106, ring flanges 48, 60 and fill tube 104 deform to create a ring seal therebetween. As such a uniform compression is imposed on ring flange 48, 60 by fill tube 104. More specifically, an adequate seal is formed when ring flange 48, 60 and fill tube 104 deform such that ring flange 48, 60 appears to be whetted on fill tube 104. A ring seal in the range of twenty-five thousandths and one-hundred thousandths of an inch (0.025"–0.100") is adequate and a ring seal on the order of fifty thousandths to sixty thousandths of an inch (0.050"–0.060") is preferred to provide a fluid tight seal between vent cylinder 36, 38 and fill tube 104 of battery housing 106.

With reference now to FIGS. 7–9, vent cap assembly 210 is a one-piece assembly which is inserted into battery cover 212 having fill tubes 214 extending therefrom. Vent cap assembly 210 includes a substantially rectangular top portion 216 having three vent cylinders 218 extending downwardly therefrom. Vent cylinders 218 include a generally cylindrical portion 220 having a central aperture 222 formed therethrough. Upper and lower retaining flanges 224, 226 are formed on the outer wall of cylindrical portion 220. Similarly, ring flange 228 is formed on an outer surface of cylindrical portion 220 between upper and lower retaining flanges 224, 226. Breather slots 230 are formed in cylindrical wall 220 to provide fluid communication therethrough. As presently preferred, top portion 216 has a shoulder portion 232 formed thereon for appropriately positioning vent cap assembly 210 within battery housing 212. More specifically, battery housing 212 has a stepped recess 234 formed therein which is complimentary to shoulder portion 232. When vent cap assembly 210 is appropriately positioned in battery housing 212, stepped recess 234 receives shoulder portion 232.

As with the first preferred embodiment of the present invention, vent cap assembly 210 includes ring flange 228 to create a ring seal between vent cylinder 220 and fill tube 214 when vent cap assembly 210 is positioned on battery housing 212. With particular reference to FIGS. 8 and 9, ring flange 228 has a leading portion 228a formed on a lower edge thereof and a trailing portion 228b formed on an upper portion thereof. The intersection of leading portion 228a and trailing portion 228b defines apex 228c which is slightly rounded to provide a smooth transition therebetween. Leading portion 228a defines a first sloped face 236 having an angular orientation, α, of between twenty and forty degrees (20°–40°) relative to the outer wall 238 of vent cylinder 36. Preferably, first sloped face 236 has an angular orientation of thirty degrees (30°). Trailing portion 228b defines a second sloped face 240 having an angular orientation, β, of between ninety-five degrees and one hundred and fifteen degrees (95°–115°) relative to the outer wall 238 of vent cylinder 36. Preferably, second sloped face 240 has an angular orientation of one hundred and five degrees (105°). As previously described, the dimensional aspects of ring flange 228 and the interference between ring flange 228 and fill tube 214 are such that a ring seal is formed in the range of twenty-five thousandths to one hundred thousandths of an inch (0.025"–0.100"), and more preferably on the order of fifty thousandths to sixty thousandths of an inch (0.050"–0.060"), thereby providing a fluid tight seal between vent cap assembly 210 and fill tube 214 of battery housing 212.

It should be apparent that the present invention provides an improved vent cap assembly for use in an electrochemical battery. While the present invention has been described with reference to a particular embodiment, one skilled in the art would readily recognize that certain modifications could be made thereto without deviating from the scope of the present invention as set forth in the following claims.

What is claimed is:

1. A vent cap assembly for a battery comprising an electrolyte, the vent cap assembly comprising:
   a top portion;
   a vent cylinder extending downwardly from said top portion and arranged to be inserted into a fill tube of a battery housing;
   a ring flange formed on an outer wall of said vent cylinder having a radial thickness formed on said vent cylinder; and
   said vent cylinder insertable within the fill tube such that said ring flange deforms the fill tube to create a ring seal between said vent cylinder and the fill tube.

2. The vent cap assembly of claim 1 wherein said ring flange and said fill tube deform to create a ring seal between said vent cylinder and said fill tube.

3. The vent cap assembly of claim 1 wherein said ring flange interferes with the fill tube in the range between seven thousandths and forty thousandths of an inch.

4. The vent cap assembly of claim 3 wherein said ring flange interferes with the fill tube in the range between twenty thousandths and thirty-seven thousandths of an inch.

5. A vent cap assembly for a battery comprising an electrolyte, the vent cap assembly comprising:
   a top portion;
   a vent cylinder extending downwardly from said top portion and arranged to be inserted into a fill tube of a battery housing;

a ring flange formed on an outer wall of said vent cylinder having a radial thickness formed on said vent cylinder, wherein said ring flange comprises:

a trailing portion formed on a first end of ring flange adjacent said top portion; and a leading portion formed on an end of said ring flange opposite said first end thereof, said leading portion and said trailing portion intersecting to form an apex; and said vent cylinder insertable within the fill tube such that said ring flange deforms the fill tube to create a ring seal between said vent cylinder and the fill tube.

6. The vent cap assembly of claim 5 wherein said apex of said ring flange is slightly rounded to provided a smooth transition between said leading portion and said trailing portion.

7. The vent cap assembly of claim 5 wherein said ring flange comprises:

said leading portion including a first sloped face having an angular orientation in the range between twenty degrees and forty degrees relative to an outer wall of said vent cylinder; and said trailing portion including a second sloped face having an angular orientation in the range between ninety-five degrees and one hundred and fifteen degrees relative to said outer wall of said vent cylinder.

8. The vent cap assembly of claim 7 wherein said angular orientation of said first sloped face is thirty degrees, and said angular orientation of said second sloped face is one hundred and five degrees.

9. A vent cap assembly for a battery comprising an electrolyte, the vent cap assembly comprising:

a top portion;

a vent cylinder extending downwardly from said top portion and arranged to be inserted into a fill tube of a battery housing wherein said vent cylinder has a retaining flange formed on said outer wall;

a ring flange formed on an outer wall of said vent cylinder having a radial thickness formed on said vent cylinder, and said vent cylinder insertable within the fill tube such that said ring flange deforms the fill tube to create a ring seal between said vent cylinder and the fill tube.

10. A vent cap assembly for a battery comprising an electrolyte, the vent cap assembly comprising:

a top portion;

a vent cylinder extending downwardly from said top portion and arranged to be inserted into a fill tube of a battery housing wherein said vent cylinder has a breather slot formed therethrough;

a ring flange formed on an outer wall of said vent cylinder having a radial thickness formed on said vent cylinder, and said vent cylinder insertable within the fill tube such that said ring flange deforms the fill tube to create a ring seal between said vent cylinder and the fill tube.

11. A vent cap assembly for a battery comprising an electrolyte, the vent cap assembly comprising:

a top portion;

a vent cylinder extending downwardly from said top portion and arranged to be inserted into a fill tube of a battery housing wherein said top portion comprises an upper component and a lower component fitted in abutting relationship to define an interior volume therebetween, said vent cylinder extending from a floor portion of said lower component;

a ring flange formed on an outer wall of said vent cylinder having a radial thickness formed on said vent cylinder, and said vent cylinder insertable within the fill tube such that said ring flange deforms the fill tube to create a ring seal between said vent cylinder and the fill tube.

12. The vent cap assembly of claim 11 wherein said ring flange comprises:

said leading portion having a first sloped face having an angular orientation in the range between twenty degrees and forty degrees relative to said outer wall of said vent cylinder; and said trailing portion having a second sloped face having an angular orientation in the range between ninety-five degrees and one hundred and fifteen degrees relative to said outer wall of said vent cylinder.

13. The vent cap assembly of claim 12 wherein said floor portion has a horizontal section and an inclined section.

14. The vent cap assembly of claim 12 further comprising a baffle formed within said interior volume and circumscribing said vent cylinder.

15. The vent cap assembly of claim 12 wherein said top portion has a vent passageway formed therethrough to provide fluid communication between said interior volume and an environment outside said vent cap assembly.

16. The vent cap assembly of claim 15 further comprising a flame arrestor assembly operably disposed in said vent passageway.

17. The vent cap assembly of claim 12 further comprising a splash guard extending downwardly from said upper component into said interior volume.

18. The vent cap assembly of claim 17 wherein said splash guard extends downwardly into said vent cylinder.

19. A vent cap assembly for a battery comprising an electrolyte, the vent cap assembly comprising:

a top portion having an upper component and a lower component fitted in abutting relationship to define an interior volume therebetween, a vent passageway formed though said top portion to provide fluid communication between said interior volume and an environment outside said vent cap assembly, a splash guard extending downwardly from said upper component into said interior volume, and a floor including a horizontal portion and an inclined portion formed in said lower component;

a flame arrestor operably disposed in said vent passageway;

a vent cylinder extending downwardly from said horizontal portion of said floor and arranged to be inserted into a fill tube of a battery housing, said vent cylinder having an outer wall, a retaining flange formed on said outer wall and a breather slot formed therethrough;

a ring flange formed on said outer wall of said vent cylinder and including a trailing portion having an angular orientation of approximately one hundred and five degrees with respect to said outer wall of said vent cylinder formed at a first end of ring flange adjacent said top portion, a leading portion having an angular orientation of approximately thirty degrees with respect to said outer wall of said vent cylinder formed on an end of said ring flange opposite said first end thereof, and a rounded apex formed at an intersection of said leading and trailing portions, said vent cylinder insertable within the fill tube such that said ring flange and the fill tube deform to create a ring seal therebetween.

20. A vent cap assembly for a battery comprising an electrolyte, the vent cap assembly comprising:

a top portion;

a vent cylinder extending downwardly from said top portion and arranged to be inserted into a fill tube of a battery housing, said vent cylinder having an outer wall, a retaining flange formed on said outer wall and a breather slot formed therethrough; and a ring flange formed on said outer wall of said vent cylinder and including a trailing portion having an angular orientation of approximately one hundred and five degrees with respect to said outer wall of said vent cylinder formed at a first end of ring flange adjacent said top portion, a leading portion having an angular orientation of approximately thirty degrees with respect to said outer wall of said vent cylinder formed on an end of said ring flange opposite said first end thereof, and a rounded apex formed at an intersection of said leading and trailing portions, said vent cylinder insertable within the fill tube such that said ring flange and the fill tube deform to create a ring seal therebetween.

21. The vent cap assembly of claim 1 wherein the ring flange is formed on the outer wall of the vent cylinder at a location above a lower end of the vent cylinder.

22. The vent cap assembly of claim 5 wherein the ring flange is formed on the outer wall of the vent cylinder at a location above a lower end of the vent cylinder.

23. The vent cap assembly of claim 9 wherein the ring flange is formed on the outer wall of the vent cylinder at a location above a lower end of the vent cylinder.

24. The vent cap assembly of claim 10 wherein the ring flange is formed on the outer wall of the vent cylinder at a location above a lower end of the vent cylinder.

25. The vent cap assembly of claim 11 wherein the ring flange is formed on the outer wall of the vent cylinder at a location above a lower end of the vent cylinder.

26. The vent cap assembly of claim 19 wherein the ring flange is formed on the outer wall of the vent cylinder at a location above a lower end of the vent cylinder.

27. The vent cap assembly of claim 20 wherein the ring flange is formed on the outer wall of the vent cylinder at a location above a lower end of the vent cylinder.

* * * * *